April 4, 1961  B. DUBSKÝ ET AL  2,977,790
ELECTROMAGNETIC ROTARY VISCOMETER
Filed Oct. 9, 1957

INVENTORS
Bořivoj Dubský, Oldřich Straka
BY

United States Patent Office 2,977,790
Patented Apr. 4, 1961

2,977,790
ELECTROMAGNETIC ROTARY VISCOMETER

Bořivoj Dubský and Oldřich Straka, Prague, Czechoslovakia, assignors to Vyzkumny a zkusebni letecky ustav, Letnany, Czechoslovakia Filed Oct. 9, 1957, Ser. No. 689,198

Claims priority, application Czechoslovakia Oct. 19, 1956

1 Claim. (Cl. 73—60)

The present invention relates to an electromagnetic rotary viscometer utilizing the so-called "Wiedeman's effect," which is based on magnetostrictional properties of ferromagnetic materials.

Viscosity is measured by means of flow-type viscometers, ball-viscometers, bubble-viscometers and rotary viscometers. The electromagnetic viscometer according to the invention is a rotary viscometer. These viscometers may be used for measuring the absolute value of dynamic viscosity or, in a simplified arrangement suitable for practical operation, for surveying processes, in chemical production, biological research and other technical fields. Up to now the measuring operation itself has been effected mostly by optically reading the deflection angle of a moving cylinder.

The principle of the electromagnetic viscometer according to the invention is the same as that of a rotary viscometer, but the optical reading of the deflection is replaced by an electromagnetic device comprising a torsional ferromagnetic rod, which is cylindrically magnetized by an exciting circuit and induces, in a pick-up circuit, an electromotive force, which is proportional to the torsional deflection of the rod and therefore also to the kinetic viscosity.

Figure 1:
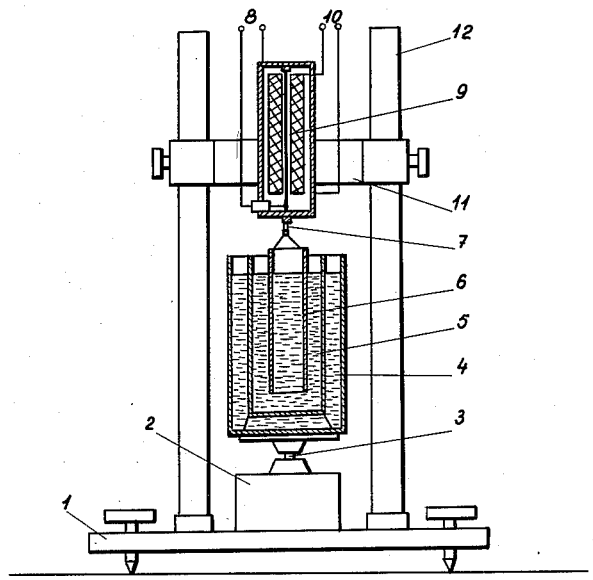
Figure 2:
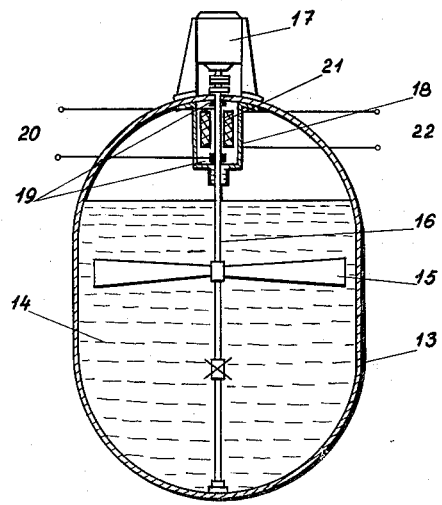

Two typical embodiments of the invention are diagrammatically shown in the accompanying drawing, wherein:

Fig. 1 is a vertical sectional view of a viscometer for laboratory measurements and Fig. 2 is a similar view of a viscometer suitable for measurements conducted during manufacturing operations.

The electromagnetic rotary viscometer shown in Fig. 1 comprises a base 1 carrying a synchronous motor with a gear-box 2. Secured to the shaft 3 of the motor is a cylindrical double-jacket vessel 4. The vessel 4 contains, in its inner or central cavity, the liquid 5 to be measured, and a cylinder 6 is submerged in the liquid 5. The cylinder 6 is suspended from a torsional body 7. The latter is attached to terminals 8 and surrounded by a coil 9 connected to terminals 10. The upper end of torsional body 7, the terminals 8 and 10 and the coil 9 are secured to a yoke 11, which is vertically slidable along rods 12 fixed to the base 1 and forming, with the latter, the frame of the apparatus.

The liquid 5 to be measured is poured into the inner or central space of the cylindrical vessel 4, and water heated to a predetermined temperature is poured into the annular space between the walls of the double-jacket vessel. The yoke 11 is adjusted along rods 12 so that cylinder 6 is submerged in the liquid 5 and the synchronous motor is operated. Under the influence of viscosity, the cylinder 6 is angularly displaced in the direction of rotation, thereby twisting the torsional body 7 in proportion to the dynamic viscosity of the liquid 5. When an alternating exciting current is supplied to the torsional body 7, through the terminals 8, the torsional body or rod is circularly magnetized to the saturation state about its longitudinal axis but no axial magnetization component is produced until the rod 7 is twisted, whereupon said electromagnetic field becomes deformed by the torsional stress in such a way, as to produce a longitudinal or axial magnetization component which is proportional to the twist and therefore also to the viscosity, and which induces an electromotive force in the pick-up coil 9. The induced electromotive force is fed to the terminals 10 and can be made to operate a remotely located indicator or recorder (not shown) which is electrically connected to such terminals. The pick-up circuit and the exciting circuit may be interchanged.

Fig. 2 shows a modified embodiment of the electromagnetic rotary viscometer, comprising a non-rotatable vessel 13, which contains the liquid 14 to be measured. A shaft 16 extends axially through the vessel and carries an agitator 15 within the latter. Outside the vessel 13 a motor 17 is connected to shaft 16 to rotate the latter. Adjacent the cover of the vessel 13 in a measuring space 18 brushes 19 are mounted and slidably engage the shaft 16. The brushes 19 are connected through conductors to terminals 20. A coil 21 is also mounted in space 18 around the shaft 16 and is connected to terminals 22.

The liquid 14, the viscosity of which is to be measured, is stirred by the agitator 15 rotated in the vessel 13 by way of the shaft 16 driven from the motor 17. The total torque produced by the motor 17, when the state of equilibrium is reached, is proportional to the kinetic viscosity of the liquid 14. The shaft 16 is subjected to a torsional stress by the torque. When an exciting current is fed by the terminals 22 to the coil 21, a longitudinal electromagnetic field is generated, that is, a flux in the surface of shaft 16 which is parallel to the axis of the latter, but, when the shaft 16 is subjected to a torsional stress, the flux lines of the generated field form an angle in relation to the generatrix of the surface of shaft 16. Such angle and the resulting circumferential component of the field is proportional to the twist and therefore also to the viscosity and induces directly in the shaft 16 or in a torroidal coil (not shown) extending around the shaft, an electromotive force which, in the case of the induction of the electromotive force directly in the shaft, is fed directly from the brushes 19 to the terminals 20. More specifically, the brushes 19 are connected to two points on the same generatrix of the shaft 16 so that, when the shaft is not torsionally stressed, both points are at the same potential. However, when the flux lines form an angle with the generatrix as a result of torsional stressing of the shaft, a part of the generated flux will pass the loop formed by the connections to the shaft to generate a current in a measuring or recording instrument connected to terminals 20. Also in this case the pick-up circuit and the exciting circuit may be interchanged.

The measuring of viscosity according to the present invention may be arranged in a variety of ways as far as the design of the apparatus is concerned. The invention may be used with advantage in shops, where, for example, the course of thickening of a mixture or substance has to be registered and this may be carried out even in fully closed vessels under high pressures. The measurements showing the thickening may indicate when the process is finished or what kind of action has to be taken in order to adjust the process as required.

We claim:

An electromagnetic rotary viscometer comprising a frame, an electric motor mounted on said frame and having a rotated, upstanding shaft, a cylindrical, upwardly opening vessel mounted on said shaft coaxially with the latter for rotation by said motor and having inner and outer walls defining a central cavity for receiving the liquid to be measured and a surrounding jacket space for receiving a temperature stabilizing medium, a cylindrical member dimensioned to extend downwardly into said central cavity for submergence in the liquid to be measured, an elongated ferro-magnetic torsion body connected, at one end, to said cylindrical member in axial alignment with the latter, means securing the other end of said torsion body to said frame so that said torsion body is twisted in response to the rotation of said vessel with said cylindrical member submerged in the liquid to be tested, means circularly magnetizing said torsion body to the state of saturation so that an axial component of the circular magnetic flux results from twisting of said torsion body, and a pick-up coil surrounding said torsion body to have an electromotive force induced therein which is a function of said axial component of the circular magnetic flux resulting from twisting of said torsion body.

References Cited in the file of this patent

UNITED STATES PATENTS

| | | |
|---|---|---|
| 2,484,761 | Stock | Oct. 11, 1949 |
| 2,511,178 | Roters | June 13, 1950 |
| 2,679,157 | Carpenter | May 25, 1954 |

FOREIGN PATENTS

| | | |
|---|---|---|
| 764,850 | Great Britain | Jan. 2, 1957 |
| 778,024 | Great Britain | July 3, 1957 |